(12) United States Patent
Armstrong et al.

(10) Patent No.: US 9,778,011 B1
(45) Date of Patent: Oct. 3, 2017

(54) DIAL HOLDER FOR MAGNETIC BASE

(71) Applicants: Chad Armstrong, Martins Ferry, OH (US); Alan Hitchcock, Benwood, WV (US)

(72) Inventors: Chad Armstrong, Martins Ferry, OH (US); Alan Hitchcock, Benwood, WV (US)

( * ) Notice: Subject to any disclaimer, the term of this patent is extended or adjusted under 35 U.S.C. 154(b) by 0 days.

(21) Appl. No.: 15/236,727

(22) Filed: Aug. 15, 2016

Related U.S. Application Data

(60) Provisional application No. 62/207,539, filed on Aug. 20, 2015.

(51) Int. Cl.
*A47G 1/17* (2006.01)
*G01B 5/00* (2006.01)
*F16M 13/02* (2006.01)
*F16B 1/00* (2006.01)

(52) U.S. Cl.
CPC .............. *G01B 5/0004* (2013.01); *F16B 1/00* (2013.01); *F16M 13/022* (2013.01); *F16B 2001/0035* (2013.01); *F16M 2200/066* (2013.01)

(58) Field of Classification Search
CPC .. G01B 5/0004; F16B 1/00; F16B 2001/0035; F16M 13/022; F16M 2200/066

USPC .................. 248/206.5, 286.1, 289.11; 73/81; 33/DIG. 1, 836
See application file for complete search history.

(56) References Cited

U.S. PATENT DOCUMENTS

| | | | | |
|---|---|---|---|---|
| 2,280,437 A | * | 4/1942 | Levesque ............. | B23Q 3/1546 248/206.5 |
| 2,322,033 A | | 6/1943 | LeBrun | |
| 4,128,945 A | | 12/1978 | Barritt | |
| 4,196,616 A | | 4/1980 | Argabrite et al. | |
| 4,303,054 A | * | 12/1981 | Lore ....................... | B24B 41/00 125/11.01 |
| 5,194,730 A | * | 3/1993 | Herberger ............. | G01B 5/043 250/231.13 |

FOREIGN PATENT DOCUMENTS

| | | | | |
|---|---|---|---|---|
| GB | 1500040 A | * | 2/1978 | ............. F16M 11/06 |
| JP | 61022201 A | * | 1/1986 | ........... G01B 5/0004 |

* cited by examiner

*Primary Examiner* — Gwendolyn Baxter
(74) *Attorney, Agent, or Firm* — Harpman + Harpman

(57) ABSTRACT

An adjustable support holder for a gauge device on a magnetic base to provide adaptable positioning and mounting for measuring instruments. The support holder comprises of a gauge engagement platform rotatable with a support base adapted to be mounted on an electro-magnetic attachment for selectively securing on a magnetically attractive surface. An integrated remote locking assembly will selectively release and lock the rotatable platform and attached measuring gauge allowing for 360-degree rotation and orientation there therewith.

6 Claims, 3 Drawing Sheets

DIAL HOLDER FOR MAGNETIC BASE

This application claims the benefit of U.S. Provisional Application Ser. No. 62/207,539, filed Aug. 20, 2015.

BACKGROUND OF THE INVENTION

1. Technical Field

This invention relates to tool and gauge holding devices, specifically articulated adjustable armatures secured to a support surface allowing positioning and hands-free support thereto.

2. Description of Prior Art

Prior art devices of this type have relied on a variety of different support holding structures to allow for positioning and holding of tools and gauges in and on varied surfaces. See for example U.S. Pat. Nos. 2,322,033, 4,128,945, 4,196,615 and prior art magnetic dial indicator base holder Kaufhof MB-1.

U.S. Pat. No. 2,322,033 discloses a dial indicator attachment having multiple adjustable arms and assemblies that afford precise positioning and holding of a dial assembly.

U.S. Pat. No. 4,128,945 claims an attachable and detachable gauge for re-locating tested bevel gears with a positional fixed bar having a pivot block and extension arm on which a probe head is articulately mounted by its free end.

U.S. Pat. No. 4,196,616 illustrates a multiple positional support means for a hardness tester with a pair of magnetic base and interconnected pivot grooved mounting brackets there between.

Finally, prior art magnetic base dial indicator holder shown in publication titled Kaufhof MB-1 has an electro-magnetic base with a pair of mounting rods pivotally engaged to one another with a universal engagement on one end thereof.

SUMMARY OF THE INVENTION

An adjustable dial holder that provides for mounting a gauge on a magnetic base so that it can be easily rotated and positioned for required use applications. The dial holder of the invention has a rotatable gauge mount with an extending support and locking tubular armature adjustably secured to an upright rod of an electro-magnetic base. The support and locking tube arm has a locking rod selectively advanced there through for locking engagement with the rotatable gauge mount base of the dial holder.

DESCRIPTION OF THE PREFERRED EMBODIMENT

Figure 1:
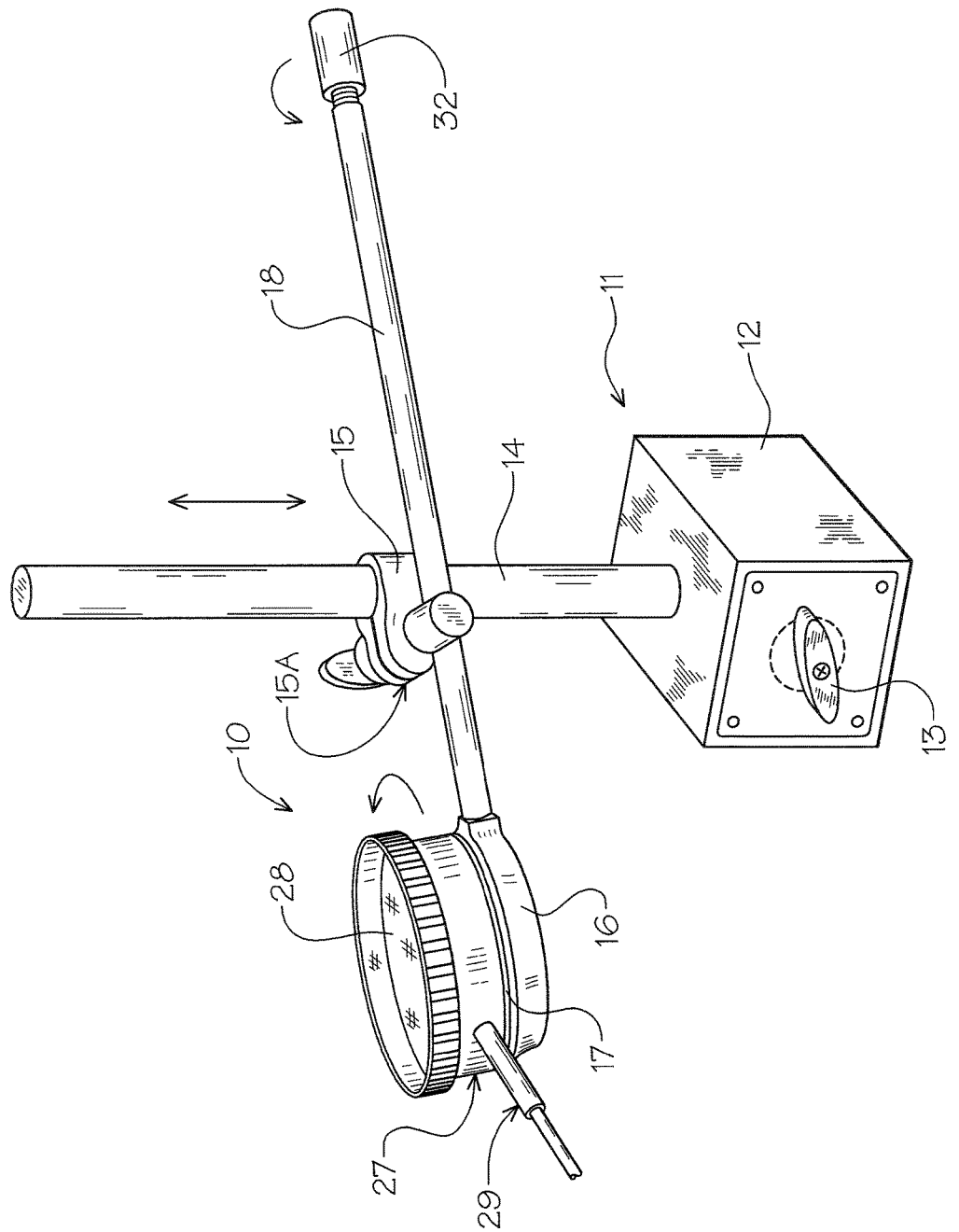
FIG. 1 is a perspective view of the dial holder of the invention.

Referring to FIG. 1 of the drawings, a dial holder 10 of the invention can be seen adjustably secured to an electro-magnetic base assembly 11, having a base 12 with an on and off switch 13, an upstanding mounting rod 14 with an adjustable instrument retention rod engagement bracket 15 thereon. The electro-magnetic base assembly 11 is well known and understood within the art, having an electro-magnet with a source of power and can be found within the industry providing a portable stabilized attachment base support for a variety of instruments and articulated clamping assemblies.

Figure 2:
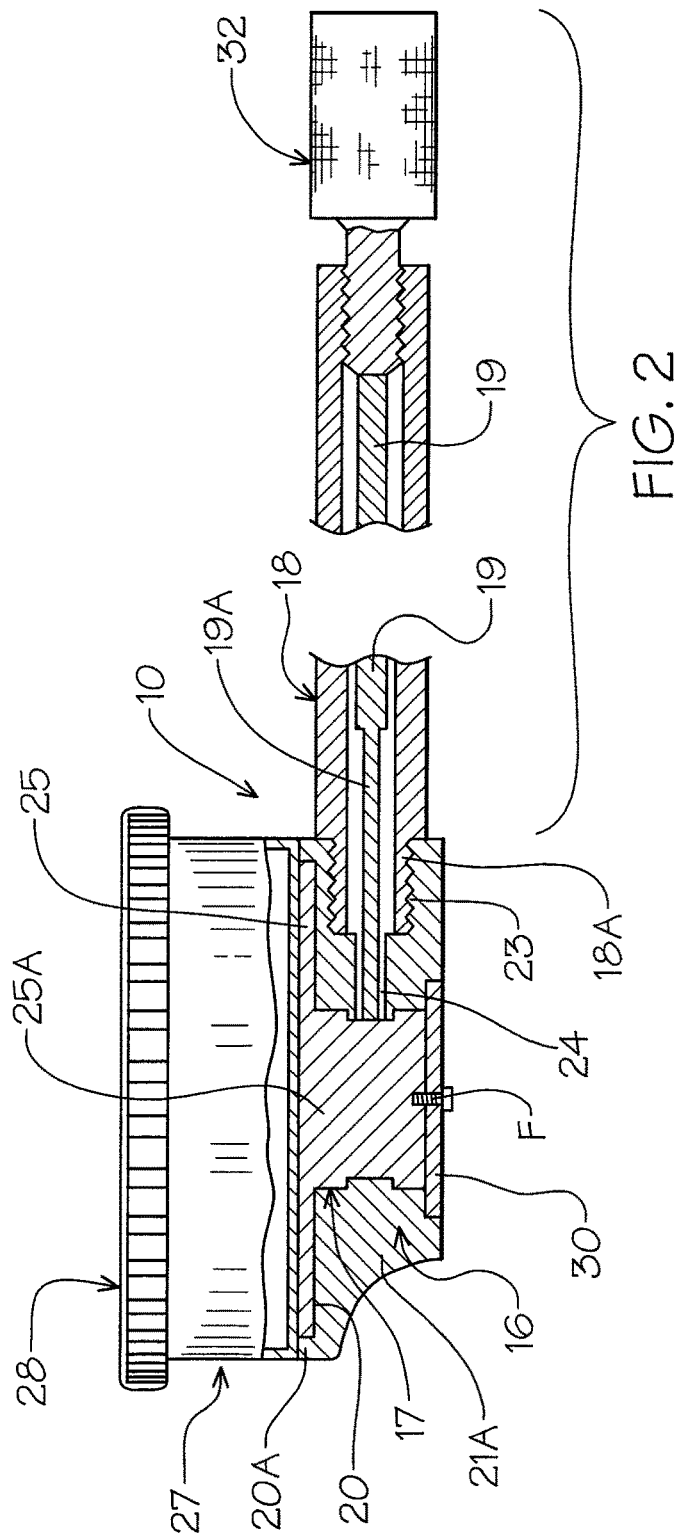
FIG. 2 is a partial sectional view of the dial holder with a gauge mounted thereto with portions broken away for illustration.

The dial holder 10 of the invention has a main body member 16 with a gauge mount 17 rotatably positioned there within, as best seen in FIG. 2 of the drawings. A tubular support armature 18 having a control rod 19 extends from and is secured to the body member 16, as will be described in greater detail hereinafter.

The tubular support armature 18 is slidably secured through the adjustable engagement bracket 15 on the mounting rod 14 by a compression friction fitting 15A as is common within the art. This orientation allows for repositioning of the tubular support armature 18 in relation to the base as needed. The dial holder 10 main body member 16, best seen in FIGS. 2 and 3 of the drawings, is generally annular with a contoured flare upper gauge mount receiving portion 19 with an annular recess at 20 therein, defining an upstanding perimeter retainment flange 20A there about.

A central bore at 21 extends centrally through the body member 16 defining an annular side wall 21A. An oppositely disposed annular recess area 22 is centered about the bore 20 within its lower surface, as seen in FIGS. 2 and 4 of the drawings.

A threaded mounting fitting 23 in the annular side wall 21A receives and secures a corresponding exteriorly threaded end 18A of the tubular support armature 18.

A control rod access opening at 24 extends from the fitting 23 in communication with the central bore 21 allowing the control rod end portion 19A to be selectively advanced into the bore 21, as will be described hereinafter.

Figure 4:
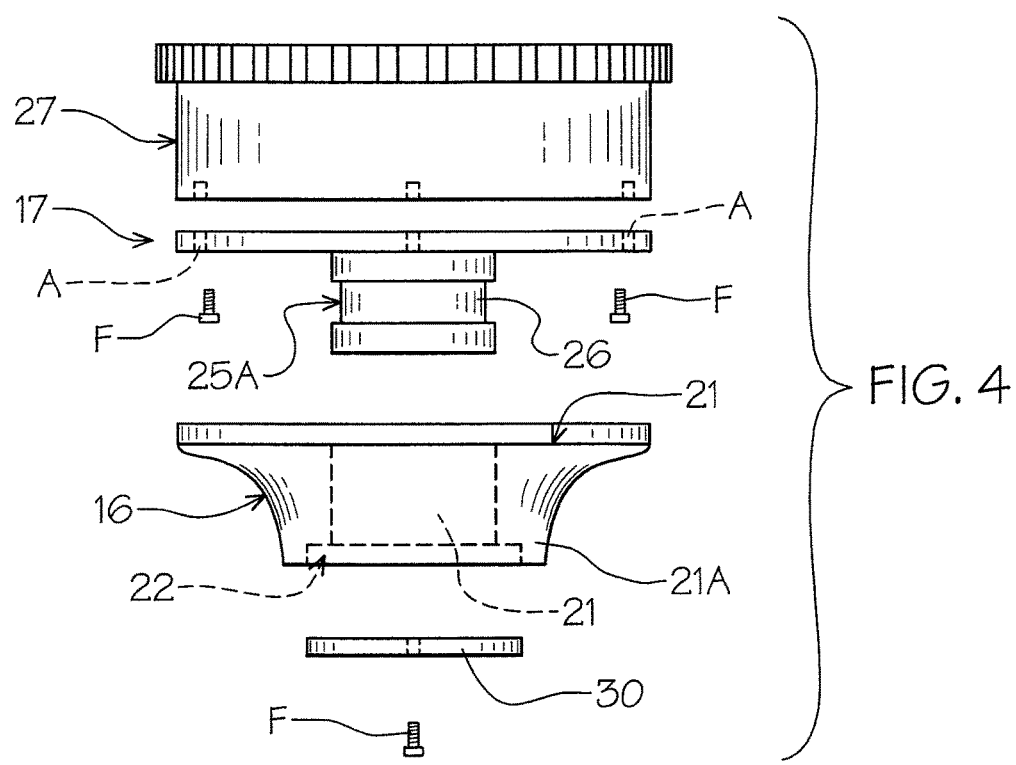
FIG. 4 is an exploded side elevation of the dial holder base and gauge to be attached thereto.

The gauge mount 17 best seen in FIGS. 2 and 4 of the drawings has an annular disc portion 25 with a central hub 25A extending therefrom. The hub 25A has an area of reduced annular dimension forming a recess engagement surface 26 there about.

A plurality of apertures A extend through the perimeter of the disc portion 25 through which threaded fasteners F extend to secure a measuring gauge 27 thereto. The gauge 27 is circular having a gauge face 28, and in this example an extending probe assembly 29. The gauge mount 17 attached to the gauge 27 is rotatably positioned within the bore 21 by the hub 25A and is retained by aperture disc 30 fitted within the lower surface recess area 22 by an integrated fastener F.

The control rod 19, end portion 19A is of reduced diameter that extends through the control rod access opening 24 for selective locking engagement with the recessed engagement surface 26 of the hub 25A.

Figure 3:
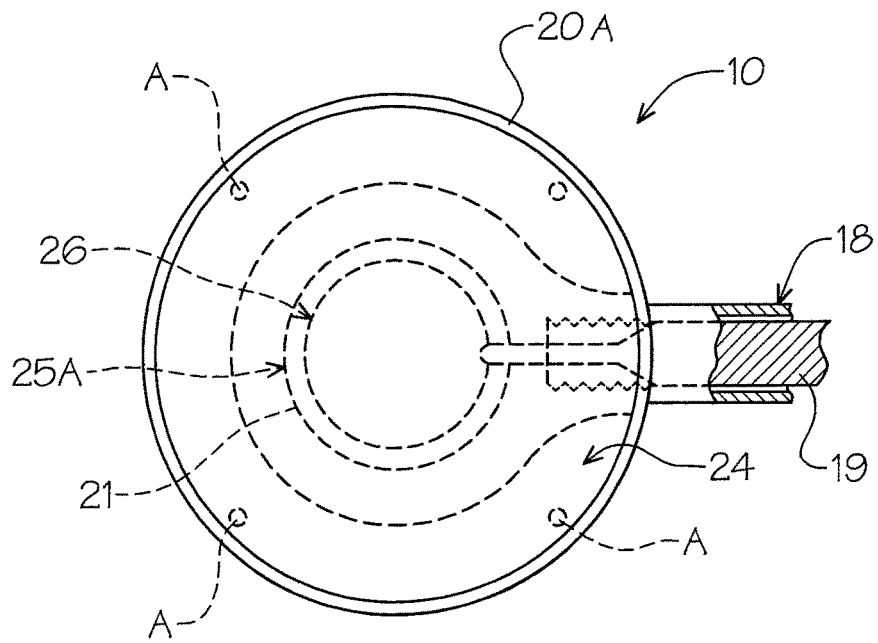
FIG. 3 is a partial sectional view of the rotatable gauge mounting platform with portions in broken lines on line 33 of the drawings.

The oppositely disposed end of the rod 19 is engaged by a rotatable hub locking adjustment fitting 32 threadably positioned within the free end of the tubular support armature 18 as best seen in FIGS. 2 and 3 of the drawings.

It will be evident from the above description that when the adjacent locking fitting 32 is rotated (by user) the control rod 19 will advance within the tubular support armature 18 and correspondingly engage the hub 25A locking the gauge mount 17 and attached gauge 27 in place within the main body member 16. Correspondingly to release the hub 25A, the fitting 32 is rotated counterclockwise releasing the pressure on the control rod end 19A, allowing the hub 25A and attached gauge 27 to freely rotate within the body member 16 for repositioning as needed. Orientation of the gauge 27 is therefore achieved by movable axis adjustment defined vertically via the rod 14, horizontally by the armature 18 through the compression fitting 15A, as well as rotatably by the gauge mount as hereinbefore described.

It will thus be seen that a new and novel gauge holder for an electro-magnetic base has been illustrated and described, and it will be apparent to those skilled in the art that various changes and modifications may be made thereto without departing from the spirit of the invention.

Therefore, we claim:

1. A multi-positional support holder for measuring gauges in different positions comprises,
   a magnetic base, an upstanding mounting rod on said base,
   a gauge engagement holder adjustably positioned on said mounting rod,
   said gauge holder comprising, a support armature,
   a gauge receiving body member on said support armature,
   a gauge attachment mount rotatably retained in said gauge receiving body,
   a control rod adjustably positioned through said armature for selective engagement with a portion of said gauge mount,
   and means for adjustably positioning said control rod in said armature.

2. The multi-positional support holder set forth in claim 1 wherein said magnetic base is electromagnetic.

3. The multi-positional support holder set forth in claim 1 wherein said support armature is tubular and threadably secured in an opening in said gauge receiving body in communication with a central bore in said gauge receiving body.

4. The multi-positional support holder set forth in claim 1 wherein said control rod comprises,
   a free end portion of reduced diameter within said armature and said gauge receiving body.

5. The multi-positional support holder set forth in claim 1 wherein said gauge mount has an annular gauge receiving disk portion,
   a central hub extending from said disk portion,
   an annular recess in said hub for select registration with a portion of said control rod.

6. The multi-positional support holder set forth in claim 1 wherein said means for adjustably positioning said control rod in said armature comprises,
   a rotatable hub fitting threadably disposed within a free end of said armature,
   said hub fitting in communication with said control rod.

* * * * *